March 12, 1963 T. E. BELING ETAL 3,081,455
CONTINUOUS WAVE MOVING TARGET INFORMATION RADAR SYSTEM
Filed April 15, 1959
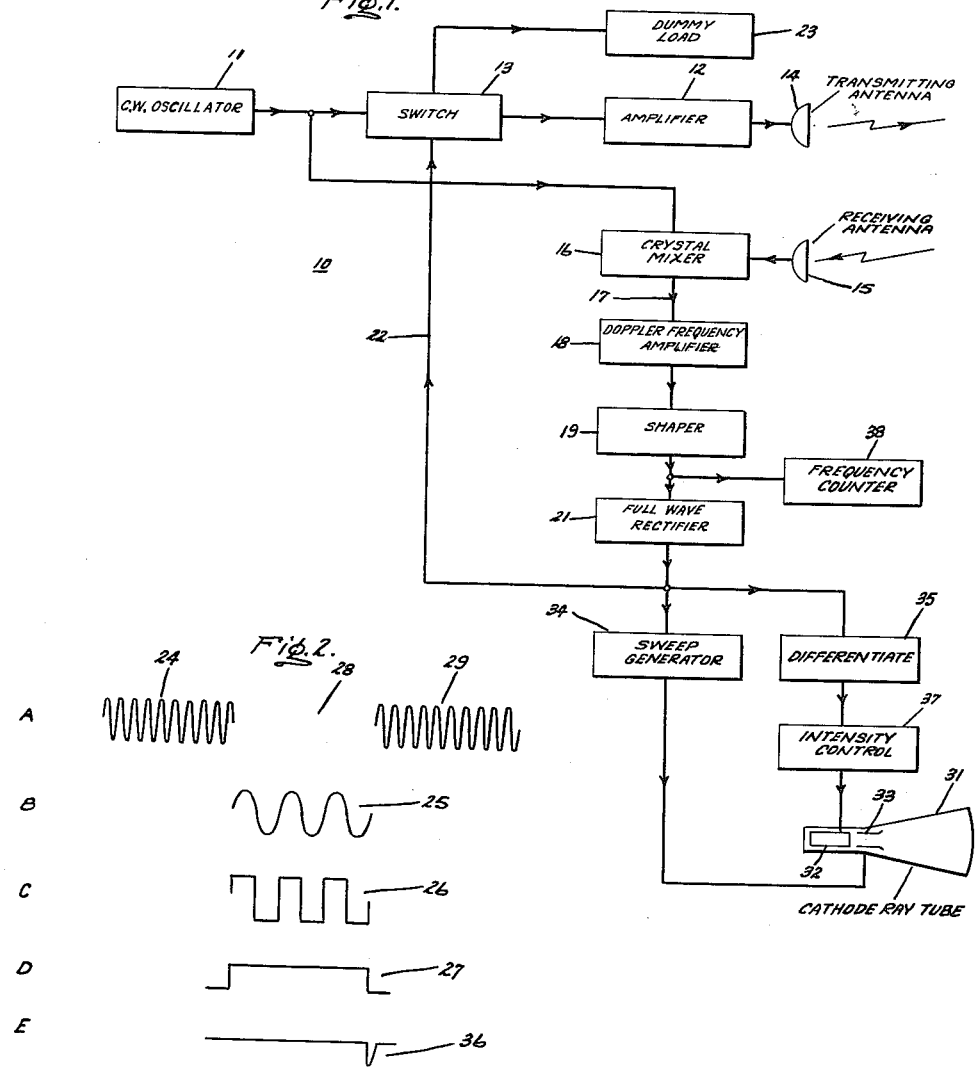
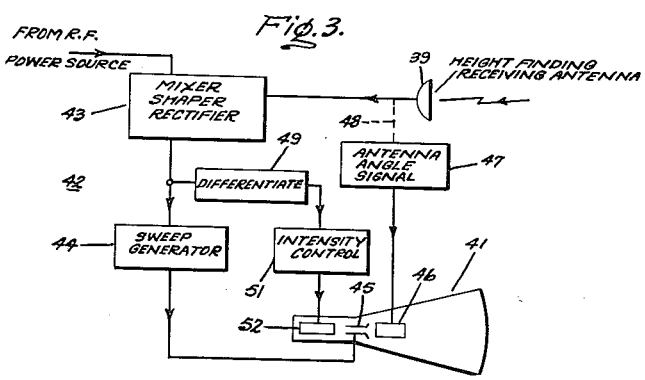
Inventors:
Thomas E. Beling,
Everett R. Schwartz
by Gust & Irish
Attorneys.

United States Patent Office 3,081,455
Patented Mar. 12, 1963

3,081,455
CONTINUOUS WAVE MOVING TARGET INFORMATION RADAR SYSTEM
Thomas E. Beling and Everett R. Schwartz, Framingham Center, Mass., assignors to International Telephone and Telegraph Corporation
Filed Apr. 15, 1959, Ser. No. 806,636
10 Claims. (Cl. 343—7.7)

This invention relates generally to radar systems and methods and more particularly to radar systems and methods of the type which detect moving targets.

In the general field of radar, there are numerous instances in which it is desirable to separate moving targets from stationary targets, and to indicate the position in space and the radial velocity of the moving targets. In prior systems and methods known to the present applicants for providing moving target information (MTI), pulsed radars were employed which first detected all targets within the field of illumination of the apparatus with the moving target information being thereafter separated from all of the target information with complicated circuitry and limited success; in addition, conventional pulsed radar systems require high power, a wide bandwidth, extremely stable oscillators, and large and bulky equipment.

It is therefore desirable to provide a radar system which will detect only moving targets, and which will present the moving target location and radial velocity with a high degree of accuracy and dependability regardless of the surroundings. It is further highly desirable that such a moving target information system and method be simpler than prior conventional systems for obtaining moving target information.

Our invention, therefore, in its broader aspects provides a system which attains moving target information, i.e., range and azimuth (and/or elevation) of moving targets by employing continuous wave (as opposed to pulsed) illumination and detection of the doppler signal provided by moving targets. More particularly, in accordance with our invention, moving targets are separated from clutter by continuously generating a continuous wave radio frequency signal, radiating the signal, receiving the radiated signal reflected from the distant target, comparing a sample of the generated signal with the reflected signal, and detecting the result of the comparison to provide the doppler signal; clutter is thus automatically removed by this process since it has essentially no motion and therefore does not generate a doppler signal. Angular position of a thus detected moving target, i.e., azimuth and/or elevation, is determined, as in conventional radar systems and methods, by observing the position of the antenna beam or beams. In accordance with our invention, however, range of a moving target is determined by changing the transmission characteristics of the radiated signal upon detection of the doppler signal and measuring the time for the characteristics of the doppler signal to change, this time being directly related to the distance to the target. Radial velocity of the moving target is obtained, in accordance with our invention, by measuring the frequency of the detected doppler signal.

It is accordingly an object of our invention to provide an improved radar system for providing moving target information.

Another object of our invention is to provide an improved method for obtaining radar moving target information.

A further object of our invention is to provide an improved system and method for obtaining radar moving target information in which only moving targets are detected, and which is simpler and more accurate than prior systems and methods known to the present applicants.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a schematic diagram illustrating one embodiment of the improved radar moving target information system of our invention.

FIG. 2 illustrates waveforms provided by the system of FIG. 1; and

FIG. 3 is a fragmentary schematic diagram showing the addition of elevation-detecting apparatus to the system of FIG. 1.

Referring now to FIG. 1, one radar system incorporating our invention is generally indicated at 10 and comprises a radio frequency power source 11 which continuously generates a continuous wave, i.e., constant frequency and amplitude, radio frequency signal; radio frequency power source 11 may take any conventional form, such as a continuous wave magnetron or similar cavity resonator, a klystron chain, or a master oscillator-power amplifier. The generated signal to be radiated is not limited to any particular radio frequency band, but does have somewhat the same limitations as other conventional radar systems.

Radio frequency power source 11 in the embodiment of FIG. 1 is coupled to a suitable power amplifier by means of a suitable radio frequency switching device 13, such as a ferrite switch. Power amplifier 12 in turn is coupled to transmitting antenna 14.

A separate receiving antenna 15 is shown, which may be a conventional search antenna, it being readily understood that a single transmitting-receiving antenna with a suitable directional coupler, such as a ferrite coupler, may be employed as is well known to those skilled in the art. Receiving antenna 15 is coupled to one input circuit of a suitable mixer 16, such as a crystal mixer of the type described in Radio Engineering, by Terman, 3rd edition, page 535, crystal mixer 16 having its other input circuit coupled to the output circuit of radio frequency power source 11. It will now be readily understood that the mixer 16 compares or mixes a portion or sample of the generated radio frequency signal with the reflected signal received by the receiving antenna 15, the crystal mixer 16 inherently detecting the resultant signal thus in essence eliminating the original radio frequency signal so that the only output signal provided by crystal mixer 16 in its output circuit is a doppler frequency signal resulting from detection of a moving target.

It will be readily understood that the result of mixing a sample of the continuously generated radio frequency signal from the radio frequency power source 11 and the reflected signal received by the receiving antenna 15 may be expressed as $$e = a\left(\sin wt + 2\frac{wV}{C}\right)$$

where $w = 2\pi f_t$ (frequency of power source 11)
$V$ = target velocity
$C$ = velocity of propagation thus $$f_d = f_t \frac{C+V}{C-V} - f_t \approx \frac{2V}{C} f_t$$

where $f_d$ = doppler frequency

It will now be readily seen that with the transmitted frequency being eliminated as a result of detecting a signal resulting from mixing the generated radio frequency signal and the reflected signal, only a doppler signal, where present, will remain, and thus, that stationary targets and ground clutter are automatically removed since they have no motion and thus do not generate a doppler signal.

It is thus seen that the presence of a doppler signal in the output circuit 17 of mixer 16 indicates the presence of a moving target; in case only moving targets having a predetermined minimum radial velocity are of interest, a suitable filter can be inserted in the output circuit 17 of the mixer 16 which will pass only doppler signals above a predetermined frequency, thus also eliminating any slow moving targets.

The resulting doppler frequency signals are amplified by a suitable amplifier 18 which may employ ordinary audio amplifier circuits. The output circuit of amplifier 18 is in turn connected to a suitable shaping or squaring circuit 19 which squares the normally sinusoidal doppler frequency signal, shaper circuit 19 having its output circuit connected to full wave rectifier circuit 21 which inverts the negative-going squared pulses in the output of shaper circuit 19 to provide a constant-level signal. The output circuit of full wave rectifier 21 is coupled by a connection 22 to the switch 13 which may be arranged upon energization to disconnect power amplifier 12 from the radio frequency power source 11 and instead to connect a suitable dummy load 23 thereto.

Referring now additionally to FIG. 2, it will be seen in FIG. 2A that radio frequency power source 11, power amplifier 12 and transmitting antenna 14 radiate a continuous wave radio frequency signal 24 with the detected doppler signal in the output circuit of mixer 16 resulting from presence of a moving target being shown at 25 in FIG. 2B.

In the system of FIG. 1, in order to indicate the range of the thus detected moving target, transmission of the radiated signal 24 must be terminated upon detection of the doppler signal 25 and the duration of the doppler signal, i.e., the time for the doppler signal to cease, measured. It will be seen that the duration of the doppler signal is directly proportional to the range of the moving target due to the fact that the signal being transmitted at the instant transmission is terminated must travel the distance to the moving target and return before reception of the doppler signal will cease. Thus, with the velocity of propagation assumed to be 6.18 microsecond per nautical mile, it will be seen that if the moving target is one nautical mile away from the transmitting antenna, the signal being transmitted at the instant transmission is terminated will require 6.18 microseconds to travel to the target and 6.18 microseconds to return, and thus the doppler signal will have a duration of 12.36 microseconds. Likewise, if the moving target is two nautical miles removed from the transmitting antenna, the signal being transmitted at the instant transmission is terminated will require 12.36 microseconds to travel to the target and the same time to return to the receiving antenna for a total of 24.72 microseconds, i.e., the doppler signal will have a duration of 24.72 microseconds. It will now be seen that shaping circuit 19 essentially squares the sinusoidal doppler frequency signal 25, as shown at 26 in FIG. 2C, with the full wave rectifier circuit 21 in turn providing a constant-level signal 27 as shown in FIG. 2D, having a duration coextensive with the duration of the doppler signal 25. The constant-level signal 27 which has its leading edge coincident with the start of the doppler signal 25 is fed to switch 13 by conductor 22 and thus actuates switch 13 to disconnect the radio frequency power source 11 and power amplifier 12 thus terminating transmission of the radiated signal 24, as shown at 28 in FIG. 2A. Power amplifier 12 is maintained disconnected from the radio frequency power source 11 by the switch 13 during imposition of constant-level signal 27 thereon, which in turn, it will be observed, is coextensive with the duration of the doppler frequency signal 25. When the doppler frequency signal 25 ceases, constant-level signal 27 provided by full wave rectifier 21 likewise ceases, thus deactuating switch 13, reconnecting power amplifier 12 to the radio frequency power source 11 and thus resuming radiation of the continuous wave signal, as shown at 29 in FIG. 2A. It will be readily understood that in order to provide doppler frequency signal 25, it is necessary to continue the generation of the continuous wave radio frequency signal by the radio frequency power source 11, and thus, it is apparent that only the transmitted or radiated signal, and not the generated signal must be terminated, and further that it is important that the frequency of the radio frequency power source 11 not change.

In order to provide an indication of the duration of the doppler signal 25 and thus the range of the moving target, a conventional cathode ray display tube 31 is provided having a conventional electron gun assembly 32 and a suitable beam deflection element 33. Full wave rectifier 21 has its output circuit also connected to a conventional sweep voltage generator 34 which thus initiates a sweep voltage responsive to the leading edge of the constant-level output signal 27 from full wave rectifier 21. Sweep voltage generator 34 is in turn coupled to the beam deflection element 33 of cathode ray tube 31.

The output circuit of full wave rectifier 21 is further connected to a suitable differentiating circuit 35 which may be a conventional diode differentiating circuit providing a differentiated signal 36, as shown in FIG. 2F, coincident with the trailing edge of the constant-level signal 27 and thus in turn coincident with cessation or termination of the doppler frequency signal 25; differentiating circuit 35 is in turn coupled to a suitable beam intensity control circuit 37 which in turn is coupled to the electron gun 32 of cathode ray tube 31 and functions, in the absence of a signal 36, to blank the cathode ray tube 31 so that no visual indication is provided thereby. It will now be seen that pulse 36 provided by the differentiating circuit 35 indicates the target range being coincident with the cessation of the doppler frequency signal 25. The terminating pulse 36 is thus fed to the intensity control 37 which unblanks the cathode ray display tube 31 to provide a visual spot on the display screen of cathode ray tube 31 with its location along the sweep path provided by deflection element 33 being proportional to and thus indicative of the range of the moving target.

The radial velocity of the moving target may be conveniently determined by the provision of a conventional counter circuit 38 coupled to the output circuit of shaper 19, counter circuit 38 thus counting the squared pulses 26 with its count thus being indicative of the frequency of the doppler frequency signal 25 and thus in turn indicating the radial velocity of the moving target since it is the relative radial velocity of the moving target which determines the frequency of the doppler frequency signal.

It will now be seen that when a conventional search receiving antenna 15 is employed with the system and method thus far described, information as to the azimuth and range of the moving target is provided. If, in addition, it is desired to provide elevation information, it is merely necessary to add a conventional height finding receiving antenna 39, another cathode ray display tube 41, and essentially duplicate circuitry shown generally at 42 in FIG. 3. Here, height finding receiving antenna 39 feeds mixing, shaping and rectifier circuits 43 which may be duplicates of the circuits 16, 18, 19 and 21 of FIG. 1, the mixer of circuits 43 being connected to the same radio frequency power source 11 as the mixer 16 of FIG. 1. The output of the full wave rectifier of circuit 43 of FIG. 3 is again connected to a suitable sweep voltage generator 44 which is connected to a suitable deflection element 45, for example, the horizontal deflection element of cathode ray display tube 41. Here, a vertical deflection element 46 is also provided which is fed by antenna angle signal-providing circuit 47, circuit 47 by virtue of mechanical connection 48 providing a vertical deflection signal responsive to the angle of antenna 39, as is well known in the art. Again, the output of the full wave rectifier of circuits 43 of FIG. 3 is coupled to differentiating circuit 49 which may be a duplicate of differentiating circuit 35 of FIG. 1, differentiating circuit 49 again being connected to a suitable intensity control or blanking circuit 51 which is coupled to the electron gun 52 of the cathode ray tube 41. It will now be readily comprehended that the resulting visual display on cathode ray tube 41 provides both range and elevation information from which height can be readily determined.

It will be readily comprehended that instead of halting transmission the instant a doppler signal is received, as described above, the frequency of the transmitted signal may be changed responsive to receipt of a doppler signal. With this arrangement, suitable filters can be utilized in the receiver to separate the two different transmitting frequencies. By employing two different transmitting frequencies in this manner, an increased signal density can be achieved.

It will now be seen that we have provided an extremely simple system and method for obtaining moving target radar information in moving targets are detected directly rather than by being separated from fixed targets. It is further seen that our invention provides ranging with a continuous wave radar system employing a single antenna system at a single location, whereas, to the best of the present applicants' knowledge, prior continuous wave radar systems required the use of more than one antenna system and triangulation in order to provide ranging information.

While we have described above the principles of our invention in connection with specific apparatus, it is to be clearly understood that this description is made only by way of example and not as a limitation to the scope of our invention.

What is claimed is:

1. A moving target information radar system comprising: means for generating a continuous wave radio frequency signal having a predetermined constant frequency and amplitude and for radiating the same; means for receiving the radiated signal reflected from a distant target; means for comparing the generated signal with the reflected signal and for detecting the resultant signal thereby providing a doppler frequency signal responsive to movement of the target; means for terminating radiation of said predetermined constant frequency and amplitude signal responsive to occurrence of said doppler signal; and means for measuring the time between the termination of radiation of said predetermined constant frequency and amplitude signal and the time for said doppler signal to cease thereby providing an indication of the range of said moving target.

2. A moving target information radar system comprising: means for generating a continuous wave radio frequency signal having a predetermined constant frequency and amplitude and for radiating the same; means for receiving the radiated signal reflected from a distant target; means for comparing the generated signal with the reflected signal and for detecting the resulting signal thereby providing a doppler frequency signal responsive to movement of the target; means for terminating radiation of said predetermined constant frequency and amplitude signal responsive to occurrence of said doppler signal; means for measuring the time between the termination of radiation of said predetermined constant frequency and amplitude signal and the time for said doppler signal to cease thereby providing an indication of the range of said moving target; and means for determining the frequency of said doppler signal thereby providing an indication of the velocity of said moving target.

3. A moving target information radar system comprising: means for continuously generating a constant frequency continuous wave radio frequency signal; means for radiating said generated signal; means for receiving the radiated signal reflected from a distant target; means coupled to said generating means and to said receiving means for mixing a portion of the generated signal with the reflected signal and for detecting the resulting signal thereby providing a doppler frequency signal responsive to movement of said target; means coupled to said mixing and detecting means and to said radiating means for terminating radiation of said continuous wave signal responsive to the start of said doppler signal and for resuming said radiation responsive to termination of said doppler signal; and means coupled to said mixing and detecting means for measuring the duration of said doppler signal thereby providing an indication of the range of said moving target.

4. A moving target information radar system comprising: means for continuously generating a constant frequency continuous wave radio frequency signal; means for radiating said generated signal; means for receiving the radiated signal reflected from a distant target; means coupled to said generating means and to said receiving means for mixing a portion of the generated signal with the reflected signal and for detecting the resultant signal thereby providing a doppler frequency signal responsive to movement of said target; means coupled to said mixing and detecting means for providing a first signal coincident with the receipt of said doppler frequency signal and a second signal coincident with cessation of said doppler frequency signal; means coupled to said radiating means and to said means for providing said first and second signal for terminating radiation of said continuous wave signal responsive to said first signal and for resuming said radiation responsive to said second signal; and means coupled to said means for providing said first and second signals for measuring the time interval between said first and second signals thereby providing an indication of the range of said moving target.

5. A moving target information radar system comprising: means for continuously generating a constant frequency continuous wave radio frequency signal; means for radiating said generated signal; means for receiving the radiated signal reflected from a distant target; means coupled to said generating means and to said receiving means for mixing a portion of the generated signal with the reflected signal and for detecting the resultant signal thereby providing a doppler frequency signal responsive to movement of said target; means coupled to said mixing and detecting means for providing a constant level signal responsive to and coextensive with the duration of said doppler frequency signal; means coupled to said radiating means and said means for providing a constant level signal for terminating radiation of said continuous wave signal responsive to said constant level signal; and means coupled to said means for providing a constant level signal for measuring the duration of said constant level signal thereby providing an indication of the range of said moving target.

6. A moving target information radar system comprising: means for continuously generating a constant frequency continuous wave radio frequency signal; means for radiating said generated signal; means for receiving the radiated signal reflected from a distant target; means coupled to said generating means and to said receiving means for mixing a portion of the generated signal with the reflected signal and for detecting the resultant signal thereby providing a doppler frequency signal responsive to movement of said target; means coupled to said mixing and detecting means for providing a constant level signal responsive to and coextensive with the duration of said doppler frequency signal; means coupled to said radiating means and said means for providing a constant level signal for terminating radiation of said continuous wave signal responsive to said constant level signal; means coupled to said means for providing a constant level signal for measuring the duration of said constant level signal thereby providing an indication of the range of said moving target; and means coupled to said mixing and detecting means for measuring the frequency of said doppler frequency signal thereby providing an indication of the velocity of said moving target.

7. A moving target information radar system comprising: means for continuously generating a constant frequency continuous wave radio frequency signal; means for radiating said generated signal; means for receiving the radiated signal reflected from a distant target; means coupled to said generating means and to said receiving means for mixing a portion of the generated signal with the reflected signal and for detecting the resultant signal thereby providing a doppler frequency signal responsive to movement of said target; means coupled to said mixing and detecting means for providing a constant level signal responsive to and coextensive with the duration of said doppler frequency signal; means coupled to said radiating means and said means for providing a constant level signal for terminating radiation of said continuous wave signal responsive to said constant level signal; a cathode ray tube having beam providing and deflection means; sweep voltage generating means coupled to said beam deflection means and to said means for providing a constant level signal for initiating a sweep voltage responsive to initiation of said constant level signal; and means coupled to said means for providing a constant level signal and to said means for providing a beam for initiating the electron beam in said tube responsive to termination of said constant level signal.

8. A moving target information radar system comprising: means for continuously generating a constant frequency continuous wave radio frequency signal; means for radiating said generated signal; means for receiving the radiated signal reflected from a distant target; means coupled to said generating means and to said receiving means for mixing a portion of the generated signal with the reflected signal and for detecting the resultant signal thereby providing a doppler frequency signal responsive to movement of said target; means coupled to said mixing and detecting means for shaping said doppler frequency signal from a sinusoidal wave to a square wave; full wave rectifier means coupled to said shaping means for rectifying said square wave to provide a constant level signal coextensive with the duration of said doppler frequency signal; switching means coupled to said radiating means and to said rectifier means for terminating radiation of said continuous wave signal responsive to said constant level signal; and means coupled to said rectifier means for measuring the duration of said constant level signal thereby providing an indication of the range of said moving target.

9. A moving target information radar system comprising: means for continuously generating a constant frequency continuous wave radio frequency signal; means for radiating said generated signal; means for receiving the radiated signal reflected from a distant target; means coupled to said generating means and to said receiving means for mixing a portion of the generated signal with the reflected signal and for detecting the resultant signal thereby providing a doppler frequency signal responsive to movement of said target; means coupled to said mixing and detecting means for shaping said doppler frequency signal from a sinusoidal wave to a square wave; full wave rectifier means coupled to said shaping means for rectifying said square wave to provide a constant level signal coextensive with said doppler frequency signal; switching means coupled to said radiating means and to said rectifier means for terminating radiation of said continuous wave signal responsive to said constant level signal; means coupled to said rectifier means for measuring the duration of said constant level signal thereby providing an indication of the range of said moving target; and means coupled to said shaping means for counting the pulses therefrom thereby providing an indication of the frequency of said doppler frequency signal.

10. A moving target information radar system comprising: means for continuously generating a constant frequency continuous wave radio frequency signal; means for radiating said generated signal; means for receiving the radiated signal reflected from a distant target; means coupled to said generating means and to said receiving means for mixing a portion of the generated signal with the reflected signal and for detecting the resultant signal thereby providing a doppler frequency signal responsive to movement of said target; means coupled to said mixing and detecting means for shaping said doppler frequency signal from a sinusoidal wave to a square wave; full wave rectifier means coupled to said shaping means for rectifying said square wave to provide a constant level signal coextensive with said doppler frequency signal; switching means coupled to said radiating means and to said rectifier means for terminating radiation of said continuous wave signal responsive to said constant level signal; a cathode ray tube having beam providing and deflection means; sweep voltage generating means coupled to said beam deflection means and to said rectifier means for initiating a sweep voltage responsive to initiation of said constant level signal; differentiating means coupled to rectifier means for providing a termination signal responsive to termination of said constant level signal; and beam intensity control means coupled to said differentiating means and to said means for providing a beam for initiating the electron beam in said tube responsive to said termination signal.

References Cited in the file of this patent
UNITED STATES PATENTS

| | | |
|---|---|---|
| 2,424,263 | Woodyard | July 22, 1947 |
| 2,542,983 | Beatty | Feb. 27, 1951 |